US010260433B2

(12) United States Patent
Okubo

(10) Patent No.: US 10,260,433 B2
(45) Date of Patent: Apr. 16, 2019

(54) ALTITUDE COMPENSATION FOR TARGET ENGINE SPEED IN HYBRID ELECTRIC VEHICLE

(71) Applicant: Ford Global Technologies, LLC, Dearborn, MI (US)

(72) Inventor: Carol Louise Okubo, Belleville, MI (US)

(73) Assignee: Ford Global Technolgies, LLC, Dearborn, MI (US)

( * ) Notice: Subject to any disclaimer, the term of this patent is extended or adjusted under 35 U.S.C. 154(b) by 882 days.

(21) Appl. No.: 13/834,218

(22) Filed: Mar. 15, 2013

(65) Prior Publication Data

US 2014/0278002 A1 Sep. 18, 2014

(51) Int. Cl.
| | |
|---|---|
| *F02D 28/00* | (2006.01) |
| *B60W 20/00* | (2016.01) |
| *B60K 6/365* | (2007.10) |
| *B60K 6/445* | (2007.10) |
| *B60W 10/06* | (2006.01) |
| *B60W 30/18* | (2012.01) |

(52) U.S. Cl.
CPC .............. *F02D 28/00* (2013.01); *B60K 6/365* (2013.01); *B60K 6/445* (2013.01); *B60W 10/06* (2013.01); *B60W 20/00* (2013.01); *B60W 30/18* (2013.01); *B60W 2550/13* (2013.01); *B60W 2710/0644* (2013.01); *Y02T 10/6239* (2013.01)

(58) Field of Classification Search
CPC ............. F02D 28/00; F02D 2200/1006; F02D 2250/18; F02D 2250/26; F02D 11/105; B60W 20/00
See application file for complete search history.

(56) References Cited

U.S. PATENT DOCUMENTS

| | | | |
|---|---|---|---|
| 5,166,879 A | 11/1992 | Greene et al. | |
| 6,719,076 B1 | 4/2004 | Tabata et al. | |
| 7,236,873 B2 | 6/2007 | Kuang | |
| 7,340,330 B2 | 3/2008 | Okoshi | |
| 2005/0076882 A1* | 4/2005 | Rayl | F02D 17/02 123/198 F |
| 2008/0308066 A1 | 12/2008 | Martin et al. | |
| 2009/0118939 A1 | 5/2009 | Heap | |
| 2013/0166121 A1* | 6/2013 | Takeuchi | B60K 6/445 701/22 |

FOREIGN PATENT DOCUMENTS

CN 1944136 A 4/2007

OTHER PUBLICATIONS

Chinese Office Action for Chinese Patent Application No. 201410099198.3 dated Jun. 14, 2017.

* cited by examiner

*Primary Examiner* — Jacob M Amick
(74) *Attorney, Agent, or Firm* — David Kelley; Brooks Kushman P.C.

(57) ABSTRACT

A method for controlling a hybrid electric vehicle includes selecting a first target engine speed in response to a driver power request, calculating an available engine torque at the first target engine speed, adjusting the target engine speed if the available engine torque is insufficient to satisfy the driver power request, and commanding an engine to run at the target engine speed. The first target engine speed is optimized for fuel economy. The calculated available engine torque is less than a calculated maximum engine torque at the target engine speed, such that a torque reserve is maintained for engine vacuum.

12 Claims, 4 Drawing Sheets

ALTITUDE COMPENSATION FOR TARGET ENGINE SPEED IN HYBRID ELECTRIC VEHICLE

TECHNICAL FIELD

This disclosure relates to hybrid electric vehicles and compensating for altitude conditions when setting a target engine speed.

BACKGROUND

Hybrid electric vehicles may include a generator that is used to control the speed of an engine. In response to a power demand, the engine speed and torque may be selected based on a calibratable map, which may be referred to as the energy management system (EMS) map. The EMS map is calibrated to achieve desired fuel economy and various other considerations, including performance, emissions, and vehicle noise, vibration, and harshness. The EMS map is generally calibrated based on sea level engine performance.

At some environmental conditions, such as at increased altitudes or high ambient temperatures, the torque availability of the engine may be reduced at some or all engine speeds. At such conditions, the engine may be incapable of supplying the torque specified by the EMS map at the target speed, and so the engine will not deliver the requested power at the EMS target speed. The engine speed should be increased to a point where the engine may deliver sufficient torque to satisfy the power demand.

A prior art method for controlling the engine in such conditions involves increasing the engine power request until the desired engine power is provided, as illustrated in FIG. 1. A representation of an EMS curve is shown, providing a target engine speed and engine torque for a given power demand. Here, the desired power corresponds with an EMS speed and torque as indicated at point A. A controller will command the engine to produce the EMS speed associated with point A. However, because of an environmental condition such as increased altitude, the maximum engine torque is reduced at the EMS speed, as indicated by point A'. Consequently the power supplied will be less than the desired power. In response to the power shortfall, the controller will increase the power request. As the power request increases, the commanded engine speed will increase along the EMS curve until point B is reached. At point B, the EMS speed and the reduced maximum torque correspond with point B'. The engine power at point B' is equal to the EMS power at point A, and thus the desired power is satisfied. Because the desired power is satisfied, the controller will maintain the commanded engine speed at B until the desired engine power changes.

While this method may be suitable for some applications, it is relatively time-intensive, because engine torque production is delayed from an engine torque request due to effects such as manifold filling and combustion delays. Consequently, any feedback mechanism must wait until torque is produced before determining whether there is a power shortfall and further increasing power. In addition, this method increases engine speed only until the delivered engine power equals the desired engine power. As a result, the engine will operate at its maximum torque limit. During steady-state operation this may be undesirable, because some level of engine torque reserve should be maintained in case the accelerator pedal is further depressed ("tip in") and to provide sufficient vacuum for EGR and canister purge. Furthermore, if the accelerator pedal is released ("tip out"), the actual engine speed may take some time to reach the new, lower, EMS target speed. During this time, the additional engine power requested to compensate for the reduced engine torque capability may be achievable, resulting in over-production of engine power and the potential to overcharge the battery.

Another prior art method involves an engine controller computing a table of maximum achievable engine torque at pre-specified engine speeds. These computed values were converted into a table containing maximum engine power as a function of engine speed. An interpolation is then performed on the table to determine the lowest engine speed at which a desired engine power is achievable. This process is repeated during every execution loop of the algorithm. At altitude conditions, the engine speed from this algorithm can be used to over-ride the speed from the EMS map. This method may also be unsatisfactory for some applications because it is highly processor intensive, requiring identical calculations at many different engine speeds for each execution loop.

SUMMARY

A system and method for controlling a hybrid electric vehicle according to various embodiments of the present disclosure include commanding an engine to run at a target engine speed that exceeds the optimum engine speed for fuel efficiency. This commanding is performed in response to reduced engine torque availability. At the target speed, a calculated maximum engine torque exceeds the torque required to satisfy a driver power request.

Some embodiments of the system and method further include calculating an available engine torque at the target engine speed, where the available engine torque is equal to the calculated maximum engine torque less a torque reserve to maintain engine vacuum. The available engine power at the target engine speed is then calculated, where the available engine power is equal to the product of the target engine speed and the available engine torque. A power difference is then calculated between the driver power request and the available engine power, and the target engine speed is adjusted in response to the power difference. In some such embodiments, adjusting the target engine speed includes restricting the adjusted target engine speed to be equal or greater than the engine speed optimized for fuel efficiency. Adjusting the target engine speed may also include increasing the target engine speed until the power difference is less than a calibratable threshold.

The calculated maximum torque at the target engine speed may satisfy the driver power request at the target speed and maintain a torque reserve sufficient to maintain engine vacuum. The torque reserve may vary with engine speed.

A hybrid vehicle according to embodiments of the present disclosure includes an engine and a controller. The controller is programmed to set a target engine speed in response to a driver power request, and increase the target engine speed if a calculated available torque at the target engine speed is insufficient to satisfy the driver power request.

In some embodiments, the calculated available torque at the first target engine speed is equal to a calculated maximum engine torque at the first target engine speed, less a torque reserve. In such an embodiment, the vehicle may further comprise a second controller configured to calculate a maximum engine torque at a target engine speed. In various embodiments, the first target engine speed is optimized for fuel economy at the driver power request and may be further optimized for vehicle noise, vehicle performance, vehicle emissions, or a combination of the above.

Another method for controlling a hybrid electric vehicle according to various embodiments of the present disclosure includes controlling an engine speed in response to the difference between a driver power request and an available engine power. The available engine power equals the product of a target engine speed and an available engine torque, where the available engine torque is less than a calculated maximum engine torque at the target engine speed.

Controlling engine speed may include increasing the target engine speed when the driver power request exceeds the available engine power. Controlling engine speed may also include commanding an engine speed that exceeds the target speed, where the available engine power at the commanded engine speed is at least equal to the driver power request. The available engine torque may be a calculated value equal to a calculated maximum engine torque at the target engine speed less a torque reserve to maintain engine vacuum. The torque reserve may vary with engine speed. The target engine speed may be optimized for fuel economy, vehicle noise, vehicle performance, vehicle emissions, or some combination of the above for a given engine power.

Embodiments according to the present disclosure provide a number of advantages. For example, various embodiments enable the engine to satisfy a driver power request at altitude conditions while also maintaining manifold vacuum. Embodiments according to the present disclosure also provide a fast response time by calculating a compensated target speed in advance of commanding the engine speed, rather than waiting for the engine to produce torque before evaluating the provided power.

The above advantage and other advantages and features of the present disclosure will be readily apparent form the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one possessing skill in the art to variously employ the present invention.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
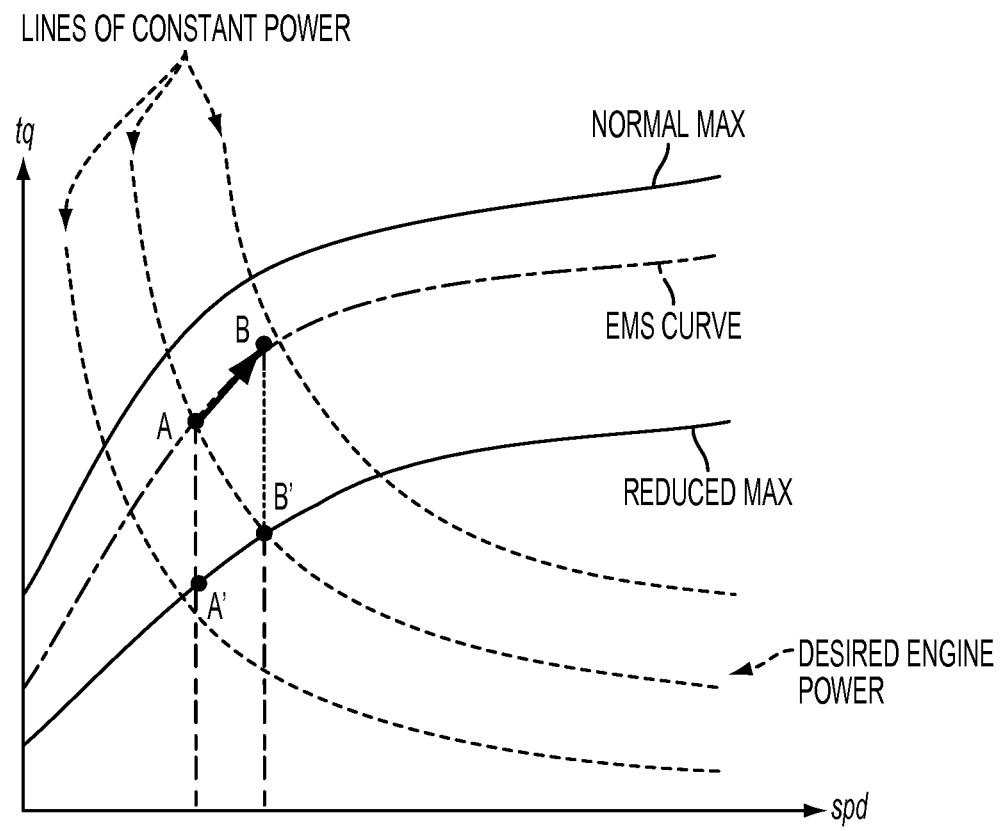
FIG. 1 illustrates a prior art method of adjusting an engine power request to supply desired engine power at altitude.
Figure 2:
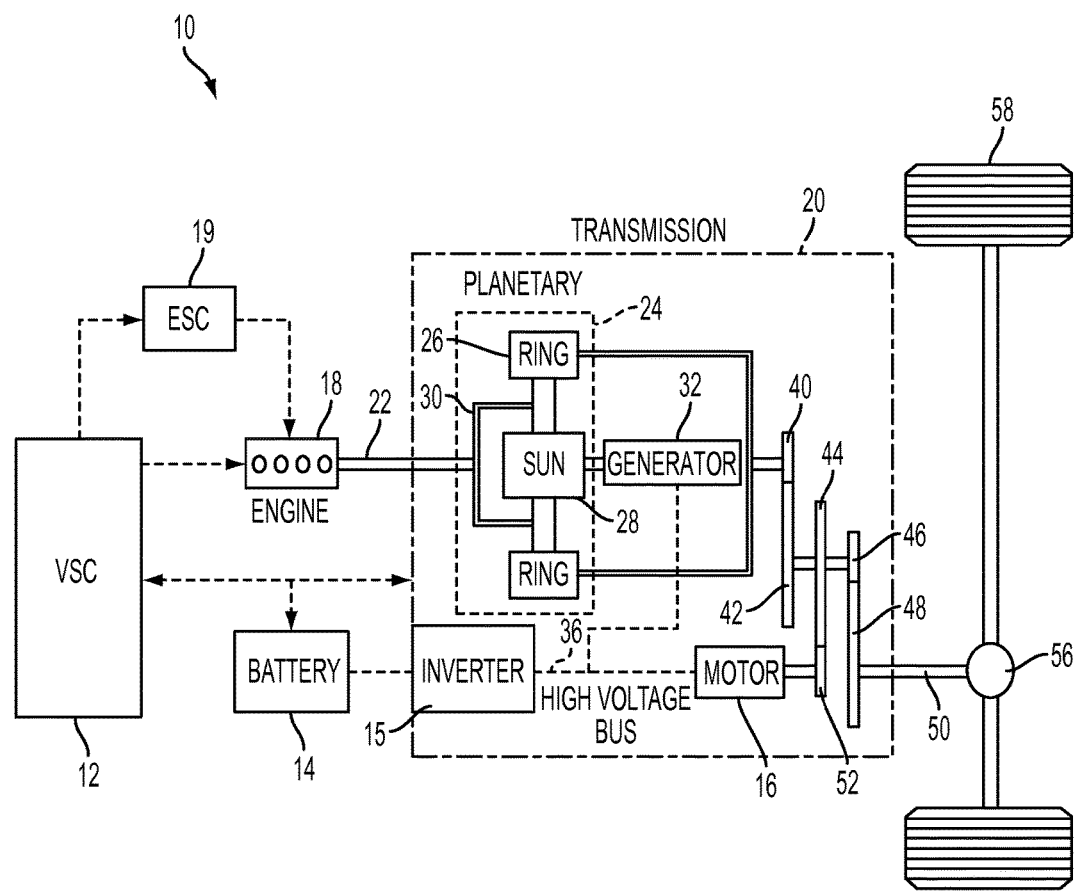
FIG. 2 illustrates a representative hybrid vehicle according to one embodiment of the present disclosure.

Referring to FIG. 2, a vehicle 10 is illustrated with a parallel hybrid powertrain, which may be referred to as a power-split powertrain or powersplit configuration. A vehicle system controller (VSC) 12 is provided, and can generally be referred to as a controller. The VSC 12 controls the power distribution in the powertrain or driveline of the vehicle 10. A traction battery, or battery 14 is provided and is controlled by the VSC 12. The battery 14 has a two-way electrical connection, such that it receives and stores electric energy through regenerative braking, for example, and also supplies the energy to an electric machine that may be operated as a motor or a generator, but is generally referenced by its primary mode of operation. In the embodiment illustrated, the electric machine is implemented by an electric traction motor 16. An inverter 15 is provided to selectively enable/disable electrical flow from the battery 14 to the motor 16. The inverter 15 converts direct current (DC) from the battery into alternating current (AC) for powering the electric machine. Alternatively, during regenerative braking, the inverter 15 converts AC from the electric machine into DC such that electric power is stored in the battery 14.

Although the control system of the vehicle 10 is illustrated to have a VSC 12, such a control system can include more than one controller, as desired. For example, a separate battery control module can directly control charging, discharging, and conditioning of the battery 14. Furthermore, a separate motor control module can be directly connected to the motor 16 and to the other controllers in the vehicle 10. It should be understood that all contemplated controllers in the vehicle 10 can be referred to as a "controller", and the VSC 12 is not necessarily limited to only one controller. Separate additional controllers and their hierarchy of a representative embodiment will be described in greater detail with reference to FIG. 2.

An internal combustion engine (ICE) 18 is also a power source for the vehicle 10. The VSC 12, in conjunction with an engine system controller (ESC) 19, controls the operation of engine 18. Both the motor 16 and the engine 18 are capable of powering a transmission 20 that ultimately delivers torque to the wheels of the vehicle 10.

Engine 18 delivers power to a torque input shaft 22 that is connected to a planetary gear set 24 via a one way clutch. Input shaft 22 powers planetary gear set 24, which includes a ring gear 26, a sun gear 28, and a planetary carrier assembly 30. Input shaft 22 is driveably connected to a carrier assembly 30 which, when powered, can rotate ring gear 26 and/or sun gear 28, which is driveably connected to another electric machine functioning primarily as a generator 32. Generator 32 may be engaged with sun gear 28, such that generator 32 may either rotate with sun gear 28, or not rotate with it. Like motor 16, generator 32 may be referred to as an electric machine as previously noted which, when utilized in other vehicle powertrain configurations, is capable of both generating electric power and providing motive power.

When engine 18 is driveably coupled to planetary gear set 24, generator 32 generates energy as a reactionary element to the operation of planetary gear set 24. Electric energy generated from generator 32 is transferred to battery 14 through electrical connections 36. Traction battery 14 also receives and stores electric energy through regenerative braking, in known fashion. Battery 14 supplies the stored electric energy to motor 16 for operation. The portion of the power delivered from engine 18 to generator 32 may also be transmitted directly to motor 16. Battery 14, motor 16, and generator 32 are each interconnected in a two-way electric flow path through electrical connections 36. The VSC 12 controls the components in the powertrain to provide proper torque distribution to the wheels.

It should be understood that motor 16 and generator 32 can both be referred to as an electric machine as previously described. Each electric machine can operate as a generator by receiving torque from the engine 18 and supplying AC voltage to inverter 15, which converts the voltage into DC voltage to charge battery 14. The electric machine can also operate as a generator by utilizing regenerative braking to convert the braking energy of the vehicle into electric energy to be stored in traction battery 14. Alternatively, the electric machine can operate as a motor that receives power from inverter 15 and battery 14 and provides torque through transmission 20 and ultimately to the wheels.

Inverter 15 selectively powers motor 16 and generator 32. Inverter 15 can include a motor inverter for selectively disabling motor 16, and a generator inverter for selectively disabling generator 32. Inverter 15 can also include a boost converter or a variable voltage controller (VVC) for altering voltage between traction battery 14 and motor 16 and generator 32.

The vehicle may be powered by engine 18 alone, by traction battery 14 and motor 16 alone, or by a combination of engine 18 with battery 14 and motor 16. In a mechanical drive mode, or a first mode of operation, engine 18 is activated to deliver torque through planetary gear set 24. Ring gear 26 distributes torque to step ratio gears 38 comprising meshing gear elements 40, 42, 44, and 46. Gears 42, 44, and 46 are mounted on a countershaft, and gear 46 distributes torque to gear 48. Gear 48 then distributes torque to a torque output shaft 50. In the mechanical drive mode, motor 16 may also be activated to assist the engine 18 in powering transmission 20. When motor 16 is active in assisting, gear 52 distributes torque to gear 44 and to the countershaft.

In an electric drive mode (EV mode), or a second mode of operation, engine 18 is disabled or otherwise prevented from distributing torque to torque output shaft 50. In the EV mode, battery 14 powers motor 16 to distribute torque through step ratio gears 38 and to torque output shaft 50. Torque output shaft 50 is connected to a differential and axle mechanism 56 which distributes torque to traction wheels 58. The VSC 12 controls battery 14, motor 16, engine 18, and generator 32 to distribute torque to wheels 58 in either the mechanical drive mode or the EV mode according to driver torque demands.

As previously described, there are two power sources for the driveline. The first power source is engine 18, which delivers torque to planetary gear set 24. The other power source involves only the electric drive system, which includes motor 16, generator 32 and battery 14, where battery 14 acts as an energy storage medium for generator 32 and motor 16. Generator 32 may be driven by planetary gear set 24, and may alternatively act as a motor and deliver power to planetary gear set 24.

It should be understood that while a power-split powertrain is illustrated in the vehicle 10, the vehicle 10 can include many other configurations. As such, it is contemplated that individual components of the powertrain may differ to suit various particular applications. For example, in another configuration that does not include a planetary gear set 24, an electric machine (motor/generator) can be provided to operate as a generator by receiving torque from the engine or regenerative braking, while the same electric machine can also operate as a motor by receiving power from the traction battery and providing torque through the transmission. Other vehicle configurations of vehicle powertrains and implementations of electric machines are contemplated, and are therefore considered to be within the scope of the present disclosure.

Figure 3:
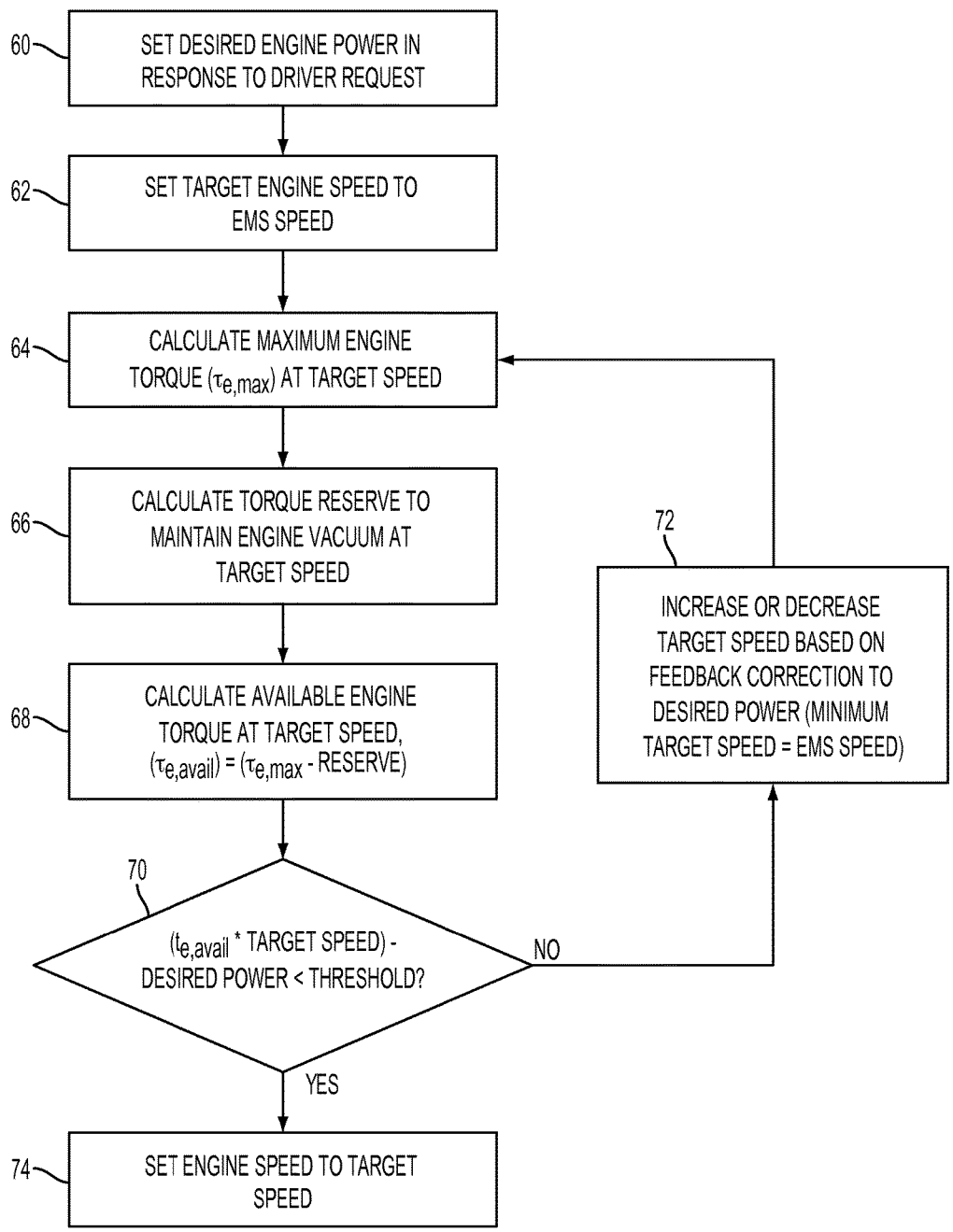
FIG. 3 illustrates operation of a system or method for controlling engine speed to supply a desired engine power according to various embodiments of the present disclosure.

Referring now to FIG. 3, operation of a system or method for controlling engine speed according to one embodiment of the present disclosure is shown. A desired engine power is determined based on a driver power request, as illustrated by block 60. The driver power request may be communicated as an accelerator pedal actuation.

A target engine speed is then selected, as illustrated by block 62. The target engine speed may be selected based on an EMS or similar map based on various operating parameters and considerations such as fuel efficiency, vehicle noise, vehicle performance, vehicle emissions, or other driver concerns. This selection may be performed by the VSC or other controller as appropriate.

A maximum engine torque $\tau_{e,max}$ is then calculated at the target engine speed, as illustrated in block 64. The maximum engine torque may be calculated based on various inputs including barometric pressure, air charge temperature, engine coolant temperature, and subsystem diagnostic information, using methods known in the art. In one embodiment, this calculation is performed by the ESC in response to a request from the VSC. In other embodiments this calculation is performed by other controllers as appropriate.

A calculation is then made of the torque reserve necessary to maintain engine vacuum at the target speed, as illustrated in block 66. The torque reserve may vary with the target engine speed. One method of calculating the required torque reserve is described in U.S. Pat. No. 7,967,720, the disclosure of which is hereby incorporated by reference in its entirety. In one embodiment this calculation is performed by the VSC. In other embodiments, the calculation may be performed by other controllers.

An available engine torque is then calculated as illustrated in block 68. The available torque is equal to the maximum engine torque less the torque reserve. The available engine torque and the target speed are multiplied together to obtain an available power at the target speed, which is then compared to the desired power as illustrated in block 70. In one embodiment these calculations are performed by the VSC. In other embodiments the calculations may be performed by other controllers.

If the difference between the available power and the desired power is not below a calibratable threshold, then the target speed is adjusted as represented in block 72. If the desired power is greater than the available power, then the target speed is increased, and if the desired power is less than the available power then the target speed may be decreased. The magnitude of the change in target speed may be determined by any feedback system known in the art. In one embodiment the feedback control is a PI controller. In one embodiment, the target speed is limited to a minimum value equal to the EMS speed to prevent over-riding the optimized curve for sea-level operation. The algorithm then returns to block 64.

If the difference between the available power and the desired power is below the calibratable threshold, then the engine speed is set to the target speed, as illustrated in block 74. A controller may then operate the engine to the target speed.

Figure 4:
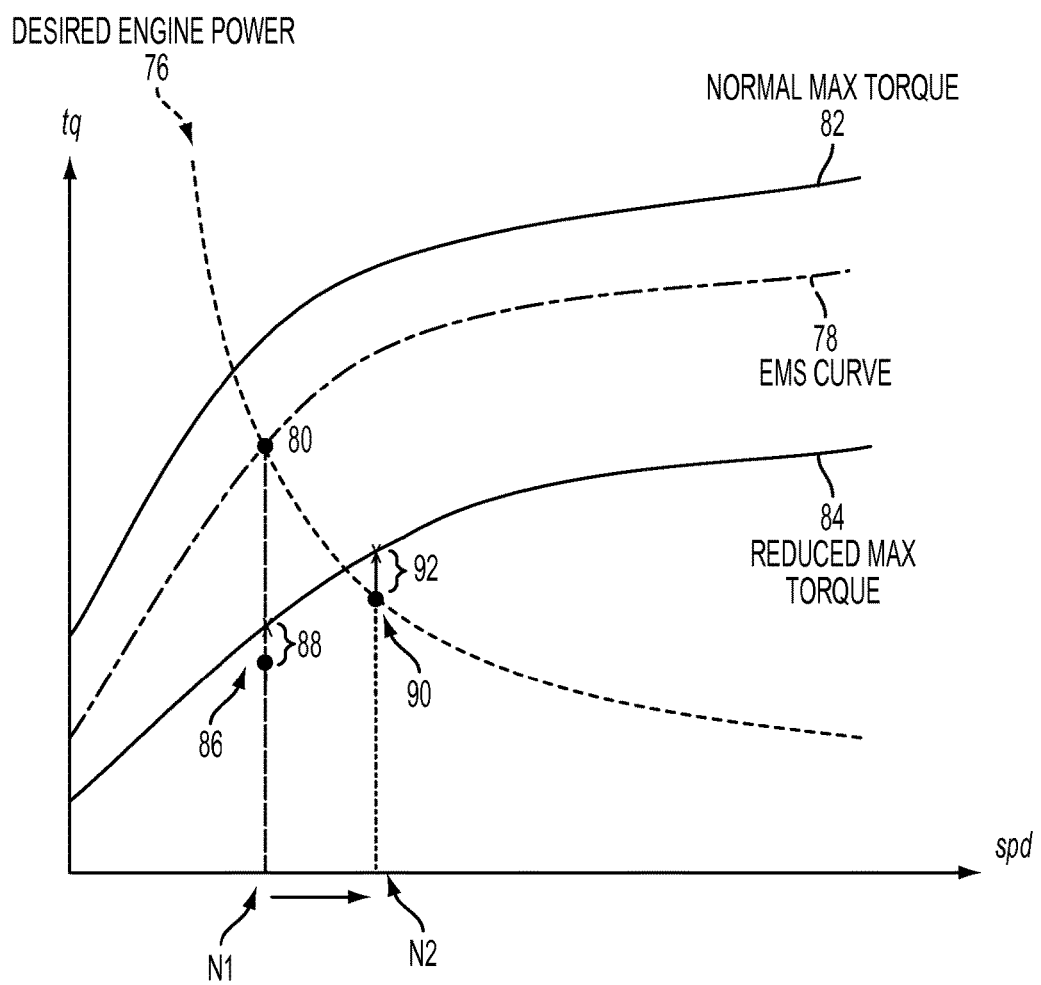
FIG. 4 is a flowchart illustrating an algorithm for controlling engine speed in a hybrid vehicle according to various embodiments the present disclosure.

FIG. 4 illustrates operation of an embodiment of a system or method according to the present disclosure. In response to a driver power request, a desired engine power 76 is set. The desired engine power may be satisfied by various combinations of engine speed and engine torque, as indicated by the dashed line. An EMS curve 78 provides an engine speed that is optimized for fuel efficiency and other concerns for any given power request. A first target engine speed N1 is set according to the EMS map, the target speed N1 and associated EMS torque indicated at point 80. Under normal engine operating conditions, the engine torque at point 80 is less than the maximum engine torque 82. At increased altitude or other conditions, the maximum engine torque may be reduced below the EMS curve, as indicated by the reduced maximum torque curve 84.

According to the present disclosure, an available engine torque is calculated at target speed N1, indicated by point 86. The available engine torque is equal to the calculated maximum achievable engine torque [indicated by an x, not numbered] at target speed N1, less a first calculated torque reserve 88. The power at point 86, given by the product of target speed N1 and the torque at point 86, is compared to desired engine power 76. Here, the difference between the desired power 76 and the power at point 86 exceeds a threshold [not shown], so the target speed is increased to N2. The new target speed N2 is selected based on feedback correction in response to the magnitude of the difference between the power at point 86 and desired power 76. An available engine torque is then calculated at target speed N2, indicated by point 90. The available engine torque is equal to the calculated maximum achievable engine torque [indicated by an x, not numbered] at target speed N2, less a second calculated torque reserve 92. The second torque reserve 92 may be different than the first torque reserve 88 because the required torque reserve to maintain engine vacuum varies with engine speed. The power at point 90, given by the product of target speed N2 and the torque at point 90, is compared to desired engine power 76. Here, the difference between the desired power 76 and the power at point 86 is less than a threshold [not shown]. A controller then operates the engine to run at target speed N2.

The diagrams of FIGS. 3-4 provide a representative control strategy for an internal combustion engine having automatic shutdown and automatic restart functions according to the present disclosure. The control strategy and/or logic illustrated in FIGS. 3-4 is generally stored as code implemented by software and/or hardware in VSC 12. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic or code represented by the simplified flow chart of FIGS. 3-4 may be implemented primarily in software with instructions executed by a microprocessor-based vehicle, engine, and/or powertrain controller, such as VSC 12 (FIG. 2). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, optical, and/or hybrid storage to keep executable instructions and associated calibration information, operating variables, and the like.

As demonstrated by the embodiments described above, a system or method for controlling a hybrid electric vehicle may control engine speed to satisfy a driver power request at altitude conditions while also maintaining manifold vacuum. The system or method also provides a fast response time by calculating a compensated target speed in advance of commanding the engine speed, rather than waiting for the engine to produce torque before evaluating the provided power.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle comprising:
in response to a currently reduced maximum engine torque capable of being produced by the engine due to ambient operating conditions, commanding an engine to run at a target engine speed exceeding an engine speed based on desired fuel efficiency, where a calculated maximum engine torque at the target engine speed exceeds a torque required to satisfy a driver power request at the target engine speed.

2. The method of claim 1, further comprising:
calculating an available engine torque at the target engine speed, the available engine torque being equal to the calculated maximum engine torque less a torque reserve to maintain engine vacuum;
calculating an available engine power at the target engine speed, the available engine power being equal to the product of the target engine speed and the available engine torque;
calculating a power difference between the driver power request and the available engine power; and
adjusting the target engine speed in response to the power difference.

3. The method of claim 2, wherein adjusting the target engine speed includes restricting the adjusted target engine speed to be equal or greater than the engine speed optimized for fuel efficiency.

4. The method of claim 2, wherein adjusting the target engine speed includes increasing the target engine speed until the power difference is less than a calibratable threshold.

5. The method of claim 1, wherein the calculated maximum engine torque at the target engine speed satisfies the driver power request at the target speed and maintains a torque reserve to maintain engine vacuum.

6. The method of claim 5, wherein the torque reserve varies with engine speed.

7. A method for controlling a hybrid electric vehicle comprising:
controlling engine speed in response to a difference between a driver power request and an available engine power, wherein the available engine power equals the product of a target engine speed and an available engine torque that is less than a calculated reduced maximum engine torque at the target engine speed due to engine or ambient operating conditions.

8. The method of claim 7, wherein the target engine speed is optimized for at least one of fuel economy, vehicle noise, vehicle performance, and vehicle emissions.

9. The method of claim 7, wherein controlling engine speed includes increasing the target engine speed when the driver power request exceeds the available engine power.

10. The method of claim 7, wherein controlling engine speed includes commanding an engine speed that exceeds the target speed, the available engine power at the commanded engine speed being at least equal to the driver power request.

11. The method of claim 7, wherein the available engine torque is equal to a calculated maximum engine torque at the target engine speed less a torque reserve to maintain engine vacuum.

12. The method of claim 11, wherein the torque reserve varies with engine speed.

* * * * *